Nov. 18, 1969 E. W. ESHENAUER, JR 3,479,653

BINARY BIT COUNTER

Filed July 14, 1964 2 Sheets-Sheet 1

INVENTOR.
EARL WILBERT ESHENAUER, JR.
BY Curtis, Morris & Safford

INVENTOR.
EARL WILBERT ESHENAUER, JR.
BY Curtis, Morris & Safford 3,479,653
BINARY BIT COUNTER
Earl Wilbert Eshenauer, Jr., Steelton, Pa., assignor to AMP Incorporated, Harrisburg, Pa.
Filed July 14, 1964, Ser. No. 382,618
Int. Cl. G11b 5/12
U.S. Cl. 340—174 3 Claims

ABSTRACT OF THE DISCLOSURE

A binary code pattern detector is disclosed including a chain of multiaperture magnetic cores linked by an input winding to be driven to store the bits of a pulse train. An auxiliary magnetic core is linked by an output winding common to a series of the multiaperture magnetic cores which winding is made to thread such multiaperture cores in a manner to respond to flux switched therein to set the auxiliary core only when a certain bit pattern is stored in the multiaperture cores. A detector output winding linking the auxiliary core senses flux switched therein to provide an output only when the given pattern is stored in the multiaperture cores.

Figure 1:
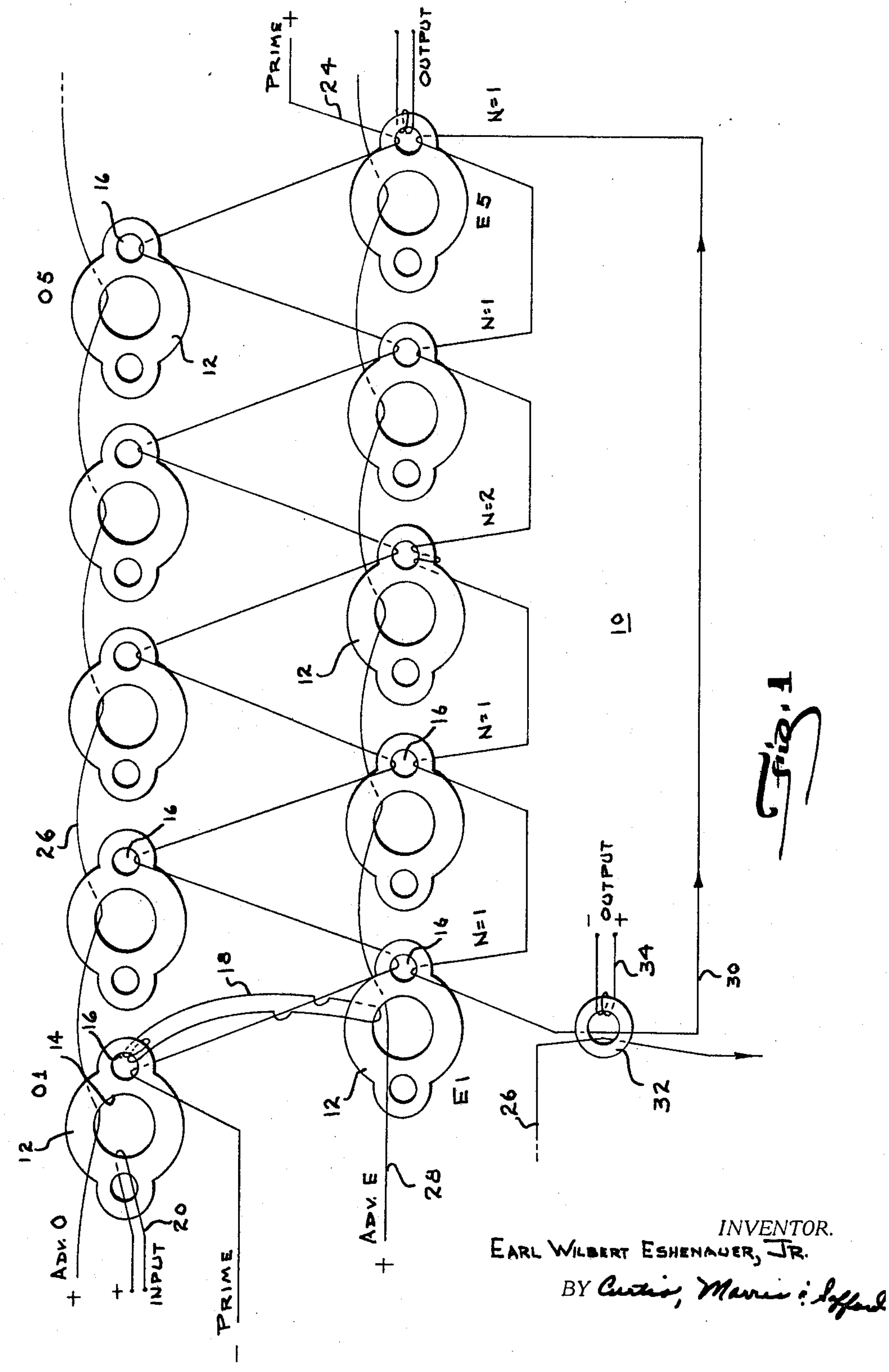

This invention relates to a counter or detector arrangement for a binary pulse sequencing circuit, more particularly the invention relates to an all-magnetic detector for a magnetic core information circuit.

An object of this invention is to provide a simple, reliable and inexpensive count detector circuit for a binary pulse sequencer.

A further object is to provide a detector which is completely compatible with a magnetic core binary pulse sequencer, and which provides reliable operation under extremes of environmental temperature, radiation and vibration conditions.

Another object is to provide such a detector which is powered solely by the magnetic cores to which it is connected.

These and other objects will in part be understood from and in part pointed out in the following description.

There are many applications, such as, in measuring time, where we would like to produce an output signal on the occurrence of a particular binary pulse sequence (that is, a train of binary ones and zeroes in a given order). In copending U.S. application Ser. No. 321,941, filed Nov. 6, 1963, now Patent No. 3,300,775, there is disclosed a circuit for generating a sequence of pulse trains and for recognizing and giving an output signal in response to a predetermined sequence of pulses. The circuit included a maximal feedback shift register having $n$ number of bits of binary memory which could be sequenced through a total of $2^n-1$ different pulse trains. Any desired one of these pulse trains would be recognized or detected by means of a second circuit having essentially as many components and costing approximately the same as the feedback shift register itself. Thus, when a binary train or count (for example, zero, zero, one, zero, zero) was to be recognized in the feedback shift register, a similar train of as many pulses was generated in the second or detector circuit. The present invention provides a considerably simplified detector circuit for a binary circuit of this general kind.

In the present invention, in one specific embodiment thereof, certain of the magnetic cores of a shift register are made to serve as part of a novel detector for a particular sequence of pulses by means of a proper wiring pattern of the magnetic cores into the detector circuit. This arrangement reduces the number of components in the overall circuit while at the same time allowing considerable flexibility in choosing the particular count or pulse sequence to be detected. Moreover, the detector circuit itself includes only wires and a magnetic core, and is powered or driven solely by the energy derived from the magnetic cores of the shift register. Thus, the count detector is not only inexpensive, but is highly efficient, and has essentially the same insensitivity to temperature variations, radiation bombardment, mechanical vibrations, etc., as have the magnetic cores of the sequencer.

A better understanding of the invention together with a fuller appreciation of its many advantages will best be gained from the following description given in connection with the single figure of drawing which shows a schematic circuit of a magnetic core sequencer and detector arrangement embodying the invention.

The circuit 10 shown in the drawing includes an upper group of multiaperture rmagnetic cores 12 (five such cores being shown) and a lower group of the same number. The upper cores for convenience will be referred to as the "odd" cores and designated O1 through O5. Similarly, the lower cores are the "even" ones and numbered E1 through E5.

Each core has a large central aperture 14 and a minor output aperture 16. Each core is connected to a succeeding core by a respective coupling loop 18, as shown linking O1 to E1. The input to 10 is shown in serial form via a loop 20 to O1. The output loop 22 is taken from E5. Information is transmitted from one core to the next by means of currents induced in the respective coupling windings when flux about the minor aperture of the core is set and then reversed in proper sequence via prime pulses supplied to lead 24 and advance pulses to leads 26 and 28. The odd group of cores is cyclically energized, or reset, by means of pulses applied to advance winding 26 which threads all of the odd cores; similarly, the even cores are threaded by a winding 28 which is energized in proper sequence relative to the odd advance winding. The actual wiring patterns of the drive windings so far described, and a detailed explanation of the operation of a magnetic core circuit generally like the one here, is given in U.S. Patent 2,995,731, to Sweeney. Briefly, this operation consists of transmitting the information, either a "one" or a "zero" in one core to the next when winding 26 or 28 is properly energized. Thus, a "one" in core O1 is transmitted to core E1, thence to core O2, and so on down the circuit. In this way, any sequence of binary pulses can be propagated along the cores.

The magnetic cores in circuit 10 may be considered as connected to be driven by a maximal feedback shift register of the kind described in U.S. patent application Ser. No. 321,941, filed Nov. 6, 1963, now Patent No. 3,300,-775. Or, it may, in fact, be part of such register with the addition of a recirculating loop linking core E5 to core O1 and "exclusive-or" windings linking cores O3 and O5 to drive E5 as described in Ser. No. 321,941. The circuit 10 can, on the other hand, be part of any system wherein the code to be detected is present. The detector of the invention is adapted to detect or identify one pattern out of a number of possible patterns of "one-zero" binary intelligence. In the embodiment illustrated, the pattern "zero, zero, one, zero, zero" will be detected each time it appears, as will be explained and, in general, the detector is adapted to operate with code patterns containing a single "one" and the remainder of the code as "zeroes."

The minor transmitting apertures of cores E1, E2, E4 and E5 are each threaded in the same sense by one turn ($N=1$) of an auxiliary winding loop 30. The latter also threads twice ($N=2$) in opposite sense the minor transmitting aperture of core E3, and the aperture of an auxiliary core 32 which may be a small toroid. The core 32 has wound on it an output winding 34 and is driven by winding 26 to the "clear" state each time winding 26 is pulsed.

With any one of cores E1, E2, E3, E4, E5 in a "zero" state, the application of a clear pulse on lead 28 will develop a small noise signal in winding 30 due to the switching of elastic flux in the core. The noise signal is, for example, one-tenth the signal produced in winding 30 when a core has a "one" rather than a "zero" in storage. The signal produced by a "one" will hereafter be referred to as a unit signal.

The polarity of the signals, from cores E1, E2, E4 and E5, by virtue of the winding sense of loop 30 through them and through auxiliary core 32, is in the direction tending to clear core 32. The threshold of the latter in switching from set to clear state and vice versa, is determined by the size of the core, its particular material, and the number of times it is threaded by winding 30. This threshold is put at one unit signal. The polarity of the signals from core E3, on the other hand, are in the opposite direction and will tend to set core 32.

Now, suppose that cores E1, E2, E4 and E5 have each received a "zero," on an odd to even advance cycle. Assuming that the noise signal from each of these cores is one-tenth of a unit signal, the four cores together will respond to being driven by a pulse on lead 28 induce four-tenths of a unit signal in winding 30. Further suppose that core E3 has received a "one." This will generate two unit signals in winding 30 as the cores are pulsed via 28; the net signal from all of the cores then being two minus four-tenths, or 1.6 unit signals. This will set core 32 and produce an output signal on winding 34. If core E3 had not received a "one," or if any of cores E1, E2, E4 or E5 had received a "one," the net signal induced in winding 30 in a sense to set 32 would be less than a unit signal, and core 32 would not have been set; hence, there would be no output signal. Once core 32 is set, it is cleared on the next even to odd advance by a pulse on winding 26 which threads the core. Clearing of the core will induce in output winding 34 a signal of the opposite polarity from that produced when the core is set and such may be used for readout detect, although it is preferred to use the input setting of 34 for such and to ignore the output when 32 is cleared.

To recognize a code pattern different from "zero, zero, one, zero, zero," winding 30 can be threaded through the E cores in a different pattern. Longer sequences of pulses can be handled by providing additional cores 12 to handle the additional information bits and by making the turns on the core which has the "one" of the detect code sufficient to provide a flux quantity always greater than the net elastic flux of the other cores by an amount sufficient to equal a unit signal so as to set the output or detect core. For example, if a twenty bit code is used with one turn for each "zero" core, then 1.9 units will be developed which must be exceeded by the flux developed by the "one" core by at least a unit signal; e.g., by providing three turns ($N=3$) to provide 3.0 unit signals on the "one" core or a net of 2.1 flux units in a proper sense to set the output core. With large bit codes it is possible to have a detect pattern containing more than a single "one." In such instance, the turns are provided on the cores having the detect "one" in a sense to set the detect core, the remaining turns being in a sense to clear the core as described previously, keeping in mind that the various non-detect patterns must, in every instance, operate so as to reduce the flux units developed by the "one" cores below the amount necessary to set the detect core and provide a detect output.

Figure 2:
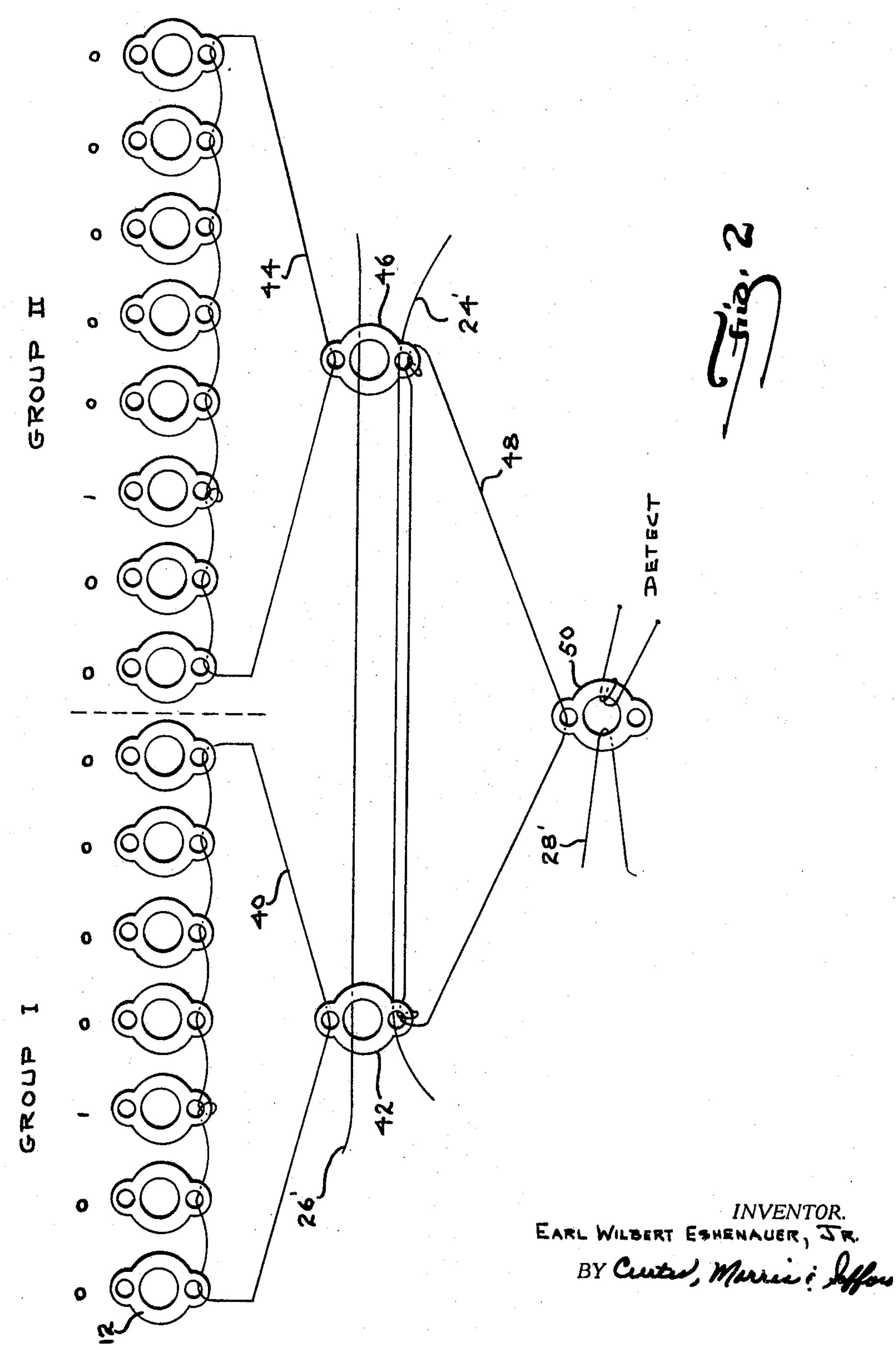

While the foregoing treatment of longer bit lengths is feasible and may at times be preferred, FIGURE 2 shows an alternative scheme for handling longer bit length which is more flexible with respect to existing core designs and practical operating limits. One of the problems which is developed by coupling loops threading continuously a large number of cores is that a loop current is developed during priming which increases in direct proportion to the number of "ones" in the remaining cores and may be enough to generate current to set the "one" core and thereafter alter the information in storage and provide a false detect or non-detect signal. FIGURE 2 shows a fifteen bit core array which may be taken to the E cores in a circuit similar to that of FIGURE 1. The detect output code for the circuit of FIGURE 2 is "zero, zero, one, zero, zero, zero, zero, zero, zero, one, zero, zero, zero, zero, zero." Rather than utilizing a single loop, such as, 30, as in FIGURE 1, the bits are divided into Groups I and II of seven and eight cores with the code content for the detect pattern being similarly divided. Group I is threaded by a winding shown as 40 having turns through the "zero" cores of such group in a sense to provide a flux output tending to clear a detect core 42 with the turns in the "one" core in a sense to set core 42. The relative number of turns are as shown. Group II is similarly divided and wound by a loop 44 passing through the "zero" cores in a sense to clear a detect core 46 and through the "one" core in a sense to set core 46. Each of the cores 42 and 46 are threaded via a further minor aperture by a further coupling loop 48, which passes through a detect core 50 common thereto. The coupling loop turns linking cores 42, 46, and 50 are such as to provide an input to core 50 only when each of the cores 42 and 46 produces a "one" or detect output. Upon core 50 being set and primed by a lead 24', an advance winding shown as 26' taken from the advance circuit of the 0 cores not shown in the circuit of FIGURE 2 is employed to clear the core and produce a detect output. In operation, the circuit and device of FIGURE 2 then will, in the separate groups, of cores, produce an output to the cores 42 and 46 only when the appropriate code pattern appears in such groups and the two cores will then produce an output to core 50 only upon the occurrence of a detect output from the two cores to thus provide a detect only when the proper fifteen bit pattern of the code is available.

In situations wherein the desired pattern contains two or more "ones" and is relatively large, the technique shown in FIGURE 2 is preferred.

The above description is intended in illustration and not in limitation of the invention. Various modifications or changes in the embodiment shown may occur to those skilled in the art and can be made without departing from the spirit or scope of the invention as set forth.

What is claimed is:

1. A code pattern detector comprising two groups of magnetic cores, means linking said cores to drive each group with an input of a given code with each bit of the code assigned to a core, means linking said cores to provide a drive to effect a transfer of the code bits therein, output windings linking separately the cores of each group and linking a further core for each group, the said windings linking at least one core and the further core of a group in a sense to set said further core responsive to being driven to transfer, the said windings linking the remaining cores of a group in an opposite sense to clear such remaining cores responsive to being driven to transfer, another winding linking said further cores to another core in a sense to be set by an output from both of said further cores whereby a said detector produces an output from said other core only when a code pattern in each of said groups produces a simultaneous output to the further cores.

2. The detector of claim 1 wherein said winding linking said further cores to another core is a single closed loop of wire.

3. The detector of claim 1 wherein the said output windings linking the cores of each group and linking a further core for each group and the said another winding linking the further cores to another core are comprised of closed loops of wire.

References Cited

UNITED STATES PATENTS

| | | | |
|---|---|---|---|
| 3,098,157 | 7/1963 | Enomoto et al. | 307—88 |
| 3,329,827 | 7/1967 | Kihn et al. | 307—88 |

STANLEY M. URYNOWICZ, Jr., Primary Examiner